Figures 3, 4:
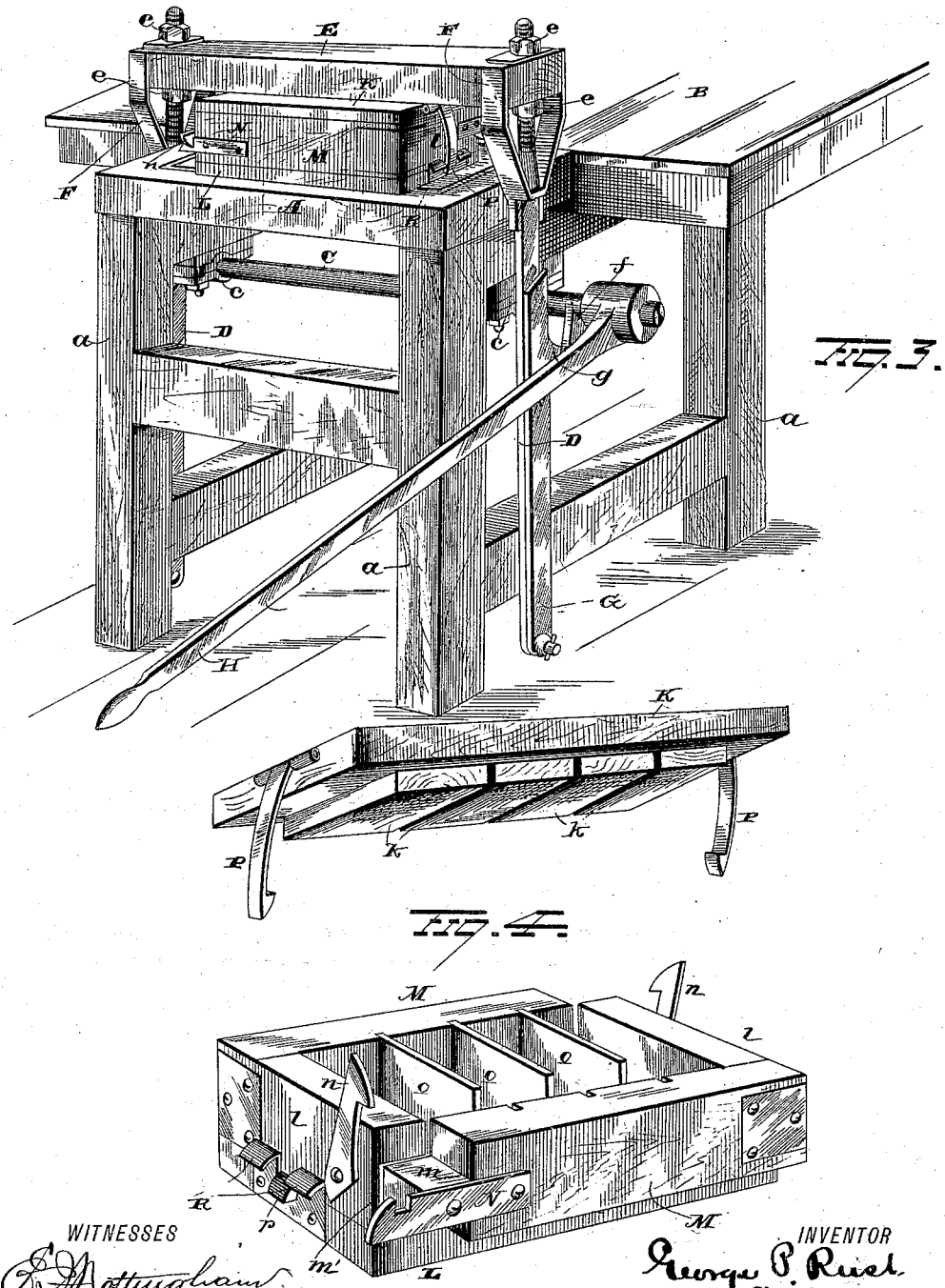

(No Model.)   2 Sheets—Sheet 1.
G. P. RUST.
FISH PACKING APPARATUS.
No. 330,929.   Patented Nov. 24, 1885.
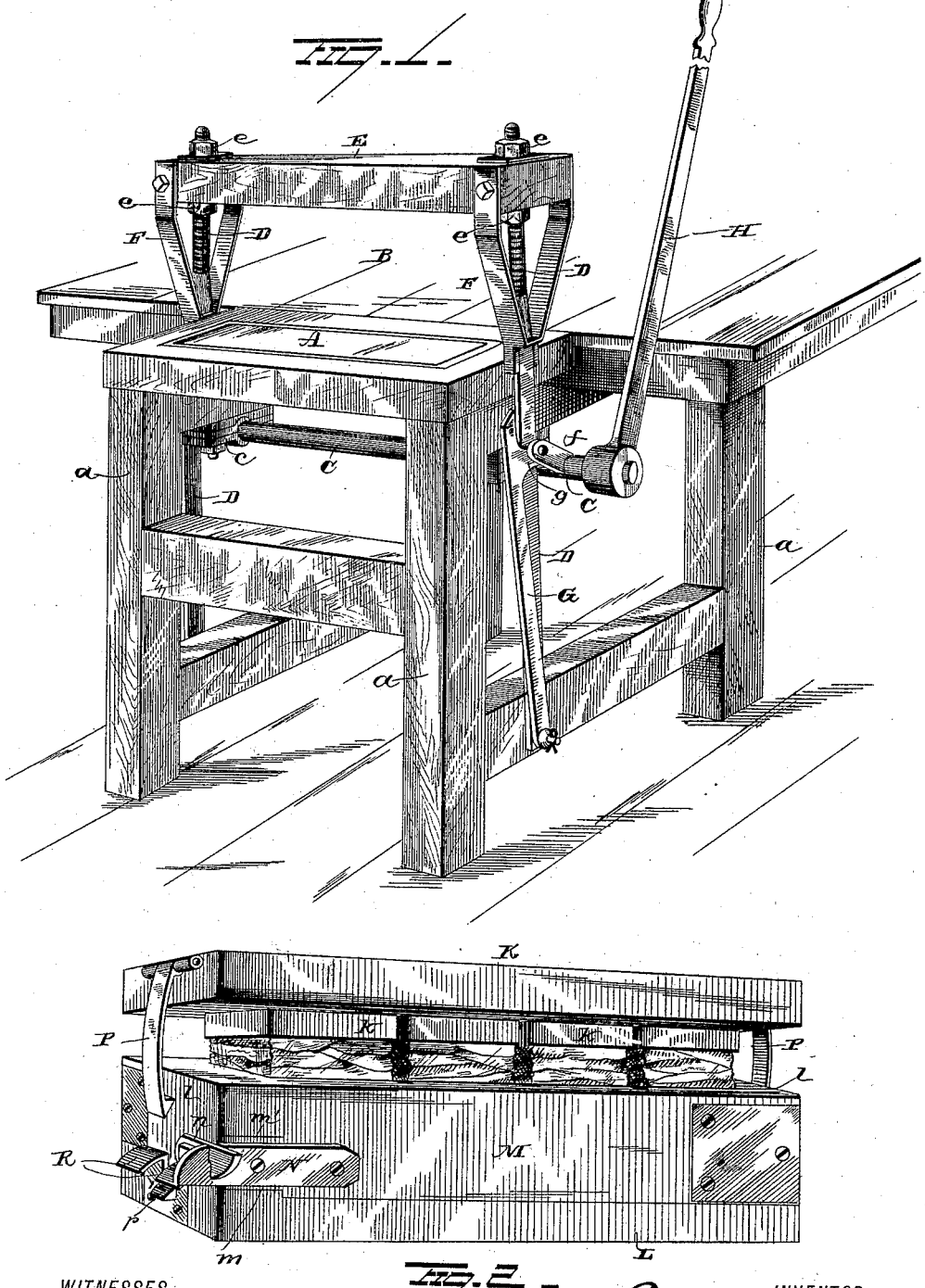
WITNESSES
INVENTOR
George P. Rust
Attorney (No Model.) 2 Sheets—Sheet 2.

G. P. RUST.
FISH PACKING APPARATUS.

No. 330,929. Patented Nov. 24, 1885.

WITNESSES
INVENTOR
George P. Rust
Attorney

UNITED STATES PATENT OFFICE.

GEORGE P. RUST, OF GLOUCESTER, MASSACHUSETTS, ASSIGNOR OF ONE-HALF TO DAVID S. PRESSON, OF SAME PLACE.

FISH-PACKING APPARATUS.

SPECIFICATION forming part of Letters Patent No. 330,929, dated November 24, 1885.

Application filed October 14, 1885. Serial No. 179,902. (No model.)

*To all whom it may concern:*

Be it known that I, GEORGE P. RUST, of Gloucester, in the county of Essex and State of Massachusetts, have invented certain new and useful Improvements in Fish-Packing Apparatus; and I do hereby declare the following to be a full, clear, and exact description of the invention, such as will enable others skilled in the art to which it appertains to make and use the same.

My invention relates to an improvement in fish-packing apparatus. In order to make a package or "brick" of fish which shall be compact, regular, and hold its shape well, it is necessary to allow pressure to remain in force for a considerable length of time—half an hour or more. To do this with the apparatus hitherto used it would require each press to stand for half an hour or more in pressing a single package. This would necessitate the use of a great number of presses in conducting a business of considerable magnitude, and would consequently require a considerable outlay of capital.

The object of my present invention is to provide means whereby a single press may be kept in constant use for compressing the fish, while the pressure may be retained for any desired length of time. A further object being to provide a press which may be worked with ease and with the least loss of time, and a follower which will automatically retain its depressed adjustment.

With these ends in view my invention consists in certain features of construction and combinations of parts, as will be hereinafter described, and pointed out in the claims.

In the accompanying drawings, Figure 1 is a view of the press ready to receive the box of fish to be compressed. Fig. 2 is a view of the box of fish ready to be inserted in the press. Fig. 3 is a view of the press in closed adjustment with box of fish therein, and Fig. 4 is a view of the box with follower removed.

A represents a firm platform supported at a convenient height upon legs *a*. As a matter of convenience, I provide a broad extended platform, B, resting upon a portion of the same supporting-frame, *a*, as the platform A rests upon. The platform B admits of the boxes of compressed fish being slid from beneath the press to make way for a succeeding box, or for preparing the boxes for entering the press, and serving as a rest to slide them into the press as the box of compressed fish is removed. Beneath the platform A the rock-shaft C is secured in strong bearings *c*, bolted to the supporting-frame. A pair of vertical bars or standards, D, are located one at each end of the platform A, their upper ends being threaded and secured in the ends of the movable head-block E by jam-nuts *e*. Yokes F, secured to the ends of the head-block E, embrace the standards D and serve as guides and braces. To the lower ends of the standards D are pivotally secured the swing bars or standards G, which extend upwardly to points a short distance above the shaft C, and are provided near their upper ends with the laterally-extending arms *g*. A pair of laterally-extending arms, *f*, firmly secured to the shaft C, are pivotally secured to the ends of the arms *g*. The shaft C is rocked by means of a hand-lever, H, secured on one of its ends, as shown. As the lever H is drawn over toward the front, the arms *f* are gradually rocked into a downwardly-extending position, and the standards D, and hence the movable head-block E, are thereby depressed. The circular paths which the ends of the arms *f* traverse when the shaft C is rocked are followed by the arms *g* of the swinging standards G, thereby reducing the sliding friction to a minimum, and as the standards G swing past the longitudinal axes of the standards D the lever, and hence the movable head-block, becomes locked in its depressed adjustment. By shortening or lengthening the length of the standard D below the movable head-block, by means of the jam-nuts *e*, the length of the vertical motion of the said head-block may be increased or diminished, as desired. The follower or movable platen K is separate from the press, and forms, when depressed, a cover for the box in which the fish are packed for pressing, and its construction will be more particularly referred to after describing the box. The box is preferably of oblong shape, and consists of a bottom, L, to which are firmly secured the ends *l*. To the diagonally-opposite ends of the ends *l* are respectively hinged the sides M, and adapted to swing outwardly, leaving the interior of the box open on both sides. The free ends of the sides M are provided with tenons *m*, which are adapted to enter mortises *m'* in the ends of the box-ends, *l*. The free ends of the sides M are further provided with the keepers N, with which the hooked latches *n*, pivoted to the ends of the box, are adapted to engage, and thereby lock the sides in closed position. The inner faces of the sides M are provided with corresponding vertical grooves, O, adapted to receive partitions *o*. A convenient number of partitions is three, dividing the box into four sections; but the number may be increased or diminished to suit the convenience of the parties interested. The under side of the platen K is provided with a series of projecting blocks, *k*, each being adapted to fit with an easy sliding motion within one of the sections formed by the partitions *o* and ends of the box. The ends of the platen K are provided with depending hooks P, hinged thereto; or the hooks may be provided with spring-shanks rigidly secured to the cover, and adapted to engage ratchet-teeth *p*, secured to the central portions of the ends of the platen, and as the same is forced downwardly onto the box containing the fish the hooks P follow down the ends of the box, and automatically, either by gravity or spring-pressure, fall into engagement with the teeth *p*, thus holding the platen depressed while the movable head-block E is released and the box with platen in position thereon is removed. The ends of the box are also conveniently provided with handles R for sliding the box on the platform, lifting into position within the press, &c.

It will be seen from the above that by providing a number of boxes and movable platens sufficient to feed the press for a half-hour (more or less) a single press can be made to do the work of many as hitherto used, and that the construction of the press, requiring but a single stroke of the hand-lever to depress the platen, saves a great share of the time hitherto employed in turning down the screws in a screw-press.

It is evident that many changes might be resorted to in the form and arrangement of the several parts described without departing from the spirit and scope of my invention; hence I do not wish to limit myself strictly to the construction herein set forth; but, Having fully described my invention, what I claim as new, and desire to secure by Letters Patent, is—

1. The combination, with a press and a receptacle adapted to hold the commodity to be pressed, of a separable platen or follower adapted to be locked to the receptacle and hold the pressure on the commodity after the press is released, substantially as set forth.

2. The combination, with a press and a receptacle adapted to hold the commodity to be pressed, of a platen or follower separate from the press and adapted to automatically lock itself to the receptacle when forced home by the press, substantially as set forth.

3. The combination, with a box or receptacle adapted to receive the commodity to be pressed, of a box-cover adapted to act as a movable platen of a press, substantially as set forth.

4. The combination, with a box separated into compartments and adapted to receive the commodity to be pressed, of a cover adapted to act as a movable platen, and provided with projections adapted to fit within the several compartments, substantially as set forth.

5. The combination, with the compartment-box, with its hinged sides, of the follower-cover with its hooks adapted to engage catches on the ends of the box, for the purpose substantially as set forth.

6. The combination, with the box and its follower-cover, of the lever-press adapted to force the follower-cover home by a single stroke, substantially as set forth.

7. In a press for packing fish, the combination, with a platform and a rock-shaft journaled beneath it, of the head-block supported upon the vertically-movable standards, and the swinging standards connecting the lower ends of the vertically-moving standards with arms on the rock-shaft, substantially as set forth.

8. The combination, with the platform, the rock-shaft, and the movable hand-block, of the vertically-adjustable standards, and the swinging standards connecting the vertically-adjustable standards with the rock-shaft, substantially as set forth.

In testimony whereof I have signed this specification in the presence of two subscribing witnesses.

GEO. P. RUST.

Witnesses:
 FRANK E. SMATHER,
 CYRUS STORY.